Aug. 25, 1925.
A. E. BRUNS
CONTAINER
Filed May 10, 1922
1,551,007
Fig. 1
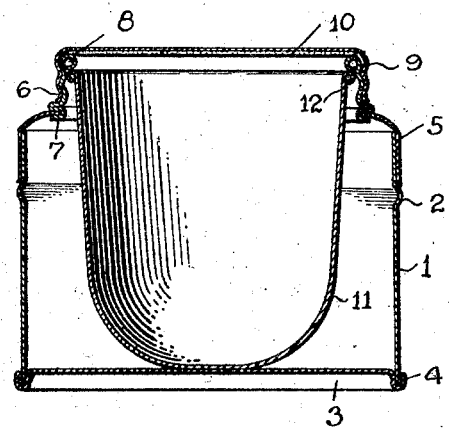
Fig. 2
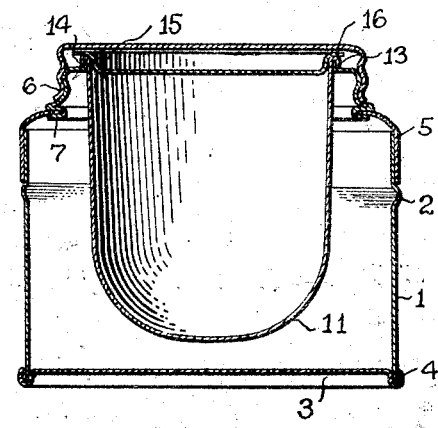
Fig. 3
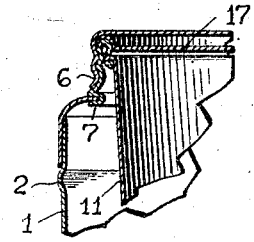
Fig. 4
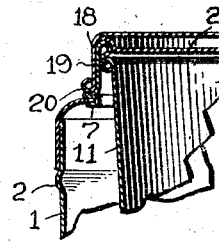
Fig. 5
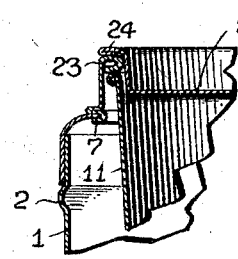
Fig. 7
Fig. 6
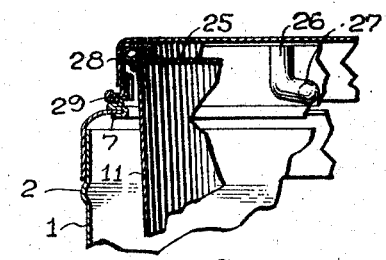
Inventor
Alfred E. Bruns.
By his Attorneys
Townsend & Decker Patented Aug. 25, 1925.

1,551,007

UNITED STATES PATENT OFFICE.

ALFRED E. BRUNS, OF NEW YORK, N. Y., ASSIGNOR TO METAL PACKAGE CORPORATION OF NEW YORK, OF NEW YORK, N. Y., A CORPORATION OF NEW YORK.

CONTAINER.

Application filed May 10, 1922. Serial No. 559,700.

*To all whom it may concern:*

Be it known that I, ALFRED E. BRUNS, a citizen of the United States, and a resident of New York, in the county of New York and State of New York, have invented certain new and useful Improvements in Containers, of which the following is a specification.

My invention relates to containers and more particularly to that class of containers adapted to hold cold cream or paste or any other viscous or analogous substances.

The principal object of the invention is the production of a container of cheapness of construction and of simplicity of manufacture, preferably made of sheet metal, and comprising essentially an outer casing and an inner shell supported thereby and adapted to hold the cold cream or paste.

Further objects of the invention consist in the provision of a container having the above characteristics, the parts of which shall be so constructed as to make for ease of assembly with provision for an air space intermediate the casing and shell whereby the contents of the shell are not susceptible to impairment due to heating of the casing in warm weather or from other causes.

Still further objects and advantages of the invention will appear from the accompanying description, the invention being more particularly defined in the appended claims forming part of the specification.

It is customary at the present time to employ glass jars as containers for cold cream which are usually closed by a metallic friction or screw-threaded cap. It is therefore necessary for the cold cream manufacturer to obtain the jar and cap from separate manufacturers to wit: manufacturers of glass articles and sheet metal articles respectively. This is objectionable as the parts sometimes do not interfit which results in expense and delay in the delivery of the product. Moreover the glass jars are objectionable because of their weight and because they cannot be lithographed, the only feasible means of decorating them being by pasting labels thereon. These labels are apt to become torn or displaced or removed particularly when the jar itself is wetted which is also objectionable. The glass jars are further objectionable in that in warm weather they become heated and the cold cream therein is apt to melt or spoil; also a certain amount of the cream becomes lodged in the corners of the jars which it is difficult to remove and which is wasted.

By the use of my invention the above noted objections are obviated. The parts which are all made of sheet metal such as tin, are so constructed that the outer casing offers a large surface area suitable for decorative lithographing without the necessity of pasting labels thereon. The container as a whole being made of sheet metal is light in weight and all the parts may be made by the same manufacturer so that they will properly interfit. Furthermore in my construction a large air space obtains intermediate the cream-holding shell and the outer casing so that normally the inner shell will remain cool and retain its contents in good condition. My construction also permits the employment of a cream-holding shell having a rounded bottom without corners or grooves which would be apt to retain some of the cream, so that none of the contents of the shell is wasted.

In the accompanying drawing illustrating a practical embodiment of the invention.

Fig. 1 is a section taken through my improved container.

Fig. 2 is a similar section showing a modification of the manner of supporting the shell.

Figs. 3 to 7 are fragmentary sections of the upper portion of the device showing modifications.

Referring in detail to the drawings and more especially to Fig. 1;

1 indicates the body of an annular casing provided with a bead 2 and a base 3 non-removably secured to said body by a flange 4 locked thereto or secured in any other manner forming no part of the invention. The annular breast of the casing is indicated at 5 and is provided with an enlarged annular opening in the top portion thereof, the upper edge of said breast comprising the wall of said opening having a screw-threaded neck 6 locked thereto by its flange 7. The lower end of the breast fits snugly over the upper end of the body 1 and is held thereto by a tight frictional engagement, the edge of said breast engaging the bead 2 which acts as a stop therefor. The breast and neck in reality constitute one element and are merely made in two parts for convenience of manufacture. The upper edge of said neck is turned over on itself or curled to form an annular abutment or bead 8 as illustrated.

9 indicates a screw-threaded cap which is adapted to be screwed on the neck 6, said cap carrying a washer 10 of felt or other suitable material adapted to engage the bead 8 when the cap is screwed "home". The inner cream-holding shell which is made of sheet metal is indicated at 11 and comprises a seamless receptacle having a continuous rounded side and bottom and an open top. The upper edge of said receptacle is curled or turned to form a bead 12 adapted to engage the bead 9 of the neck in substantial alinement therewith. To mount the shell in position within the casing, assuming the parts have been disassembled, the shell is inserted in the neck through the opening in the upper portion of the breast and the breast is forced on the upper end of the body and is held by such tight frictional engagement that it is practically locked thereto. When in this position the bottom of the shell seats on the base 3 of the body 1, said base acting as a support therefor, and the bead 12 engages the bead 9 to support the shell at its upper end, the said bead 9 acting as a stop to prevent removal of the shell through the neck 6. The shell is then filled with cold cream or other material, the cap 9 is screwed on the neck, and the container is ready for shipment or use.

It will be noted that a large air space obtains intermediate the shell and casing which is advantageous for the reasons previously set forth. It will be further noted that the raw edges of the shell 11 and neck 6 forming the ends or edges of the beads 12 and 8 respectively are not exposed but are protected against contact with any of the contents of the shell. This is of importance particularly if the parts are made of tin or similar metal and have then been enameled or coated with other material as the coating or enamelling will not adhere to raw edges, as is well known, and if the edges were exposed they would quickly develop rust, especially if they become moistened, and the rust would be apt to become mixed with the contents of the shell and spoil the same. Also the particular configuration of shell makes for the easy removal of the cold cream or other contents of the shell by the fingers of the user and also makes for economy as there are no corners or crevices in which the cream can lodge and be wasted. Also the beads present smooth surfaces which obviate injury to the fingers which would not obtain if the raw edges thereof were exposed. The construction furthermore permits this particular type of shell to be used irrespective of the outer configuration of the casing, the container having an appearance of appreciably larger size when viewed from the outside than the actual size of the part which actually holds the cold cream or other substance.

In the modification shown in Fig. 2 the shell is locked to an upstanding flange 13 on the neck by a flange 14 turned or pressed over said flange 13. The raw edges of the shell and neck are also protected in this case. It will be noted, furthermore, that in this modification it is not necessary to support the shell on the base but that a space obtains intermediate said base and shell which is advantageous as it prevents the conduction of heat from the base through the bottom of said shell. In this case, furthermore, I dispense with the washer 10 and employ a shallow plug 15 frictionally engaging within the shell and having a flange 16 engaging the upper end thereof. This plug is merely provided to protect the contents of the shell when the container is shipped and it may be removed by any suitable tool and dispensed with when the container reaches the consumer.

In the modification of Fig. 3 I show a construction similar to that of Fig. 1 with the exception that the washer 10 is dispensed with and a shallow friction plug 17 is used similar to and in the same manner as the corresponding part of the modification of Fig. 2.

In the modification of Fig. 4 the neck which is indicated at 18 is adapted to frictionally receive a slip cap or cover 19 the lower edge of which is provided with a bead 20. I also employ a shallow friction plug 21 similar to the plug 17 of Fig. 3.

In the modification of Fig. 5 I dispense entirely with a cap or cover and employ a deep friction plug 22 which is removable and which frictionally engages the side of the enlarged bead 23 on the upper end of the neck. Said plug is also provided with a folded flange 24 so that the sharp edge is eliminated to protect the fingers when the plug is removed, said folded flange seating on the bead 23.

In Fig. 6 I employ a shallow friction plug indicated at 25. The neck is also provided with a series of bayonet depressions pressed in the wall thereof and adapted to be received by lugs 27 formed on or pressed out of the wall of the cover 28 whereby the cover may be removably held to the neck. The lower edge of the cover is also provided with a bead 29.

The modification of Fig. 7 is similar to that of Fig. 6 with the exception that the plug is dispensed with and a washer 30 employed.

As is obvious, all of the modifications of Figs. 3 to 7 could be used in conjunction with the invention of Fig. 2.

Inasmuch as the breast and neck are in reality one and the same part I shall treat them as such and shall refer to them collectively in the appended claims as the "neck."

What I claim as my invention is:—

1. In a container, a casing, a removable neck portion formed thereon, a bead on said neck, a shell within said casing extending to a position within said neck, the top of said shell engaging said bead and being substantially covered thereby, whereby said container and shell present a substantially unbroken interior.

2. In a container, a casing, a neck thereon, a seamless inner shell mounted within said casing and including a substantially vertically extending side wall terminating in an outwardly projecting rolled flange, the neck of said casing terminating in a rolled flange adapted to engage the upper surface of the flange of said shell, whereby to produce a smooth exterior surface for said casing and a substantially unbroken interior surface extending flush with the neck of said casing.

3. In a container, a casing, a neck having a substantially cylindrical surface frictionally engaging a corresponding surface of said casing, a circular abutment on said neck, a shell within said casing having a portion thereof in alinement with and firmly engaged by said abutment and a removable closure engaging said neck and closing said shell.

4. In a container, a casing, a metallic neck thereon, a rolled bead on said neck, an inner metallic shell within said casing, a rolled bead on said shell engaging the lower portion of said first mentioned bead when said beads are in assembled position and having the ends of the material forming the same disposed between said shell and casing so as to be out of view from the interior or exterior of the container.

Signed at New York in the county of New York and State of New York this 8th day of May A. D. 1922.

ALFRED E. BRUNS.